United States Patent [19]

Dunseith

[11] 4,364,749
[45] Dec. 21, 1982

[54] METHOD AND APPARATUS FOR SEALING THE INLET OF A FILTER COMPARTMENT TO ISOLATE THE COMPARTMENT WITHIN A BAGHOUSE INSTALLATION

[75] Inventor: S. Michael Dunseith, Louisville, Ky.

[73] Assignee: Allis-Chalmers Corporation, Milwaukee, Wis.

[21] Appl. No.: 310,133

[22] Filed: Oct. 9, 1981

[51] Int. Cl.³ .................... B01D 46/04; B01D 46/44
[52] U.S. Cl. .................................... 55/73; 55/96; 55/97; 55/287; 55/288; 55/303
[58] Field of Search .................. 55/20, 21, 80, 96, 97, 55/261, 267, 269, 286–288, 302, 303, 73

[56] References Cited

U.S. PATENT DOCUMENTS

| | | | |
|---|---|---|---|
| 3,057,137 | 10/1962 | Perlis et al | 55/303 |
| 3,266,225 | 8/1966 | Barr | 55/303 |
| 3,325,979 | 6/1967 | Smith | 55/302 |
| 3,630,004 | 12/1971 | Adair et al. | 55/286 |
| 3,945,400 | 3/1976 | Slakey | 55/302 |
| 4,010,013 | 3/1977 | Murayama | 55/266 |
| 4,277,255 | 7/1981 | Apelgren | 55/20 |

FOREIGN PATENT DOCUMENTS 55-40287 10/1980 Japan ......................... 55/97

Primary Examiner—David L. Lacey
Attorney, Agent, or Firm—Thomas G. Anderson

[57] ABSTRACT

A method and apparatus for isolating one or more of the filter compartments in a baghouse installation wherein an inlet damper having a pair of spaced closure members is provided in the inlet duct of each of the compartments. When the inlet damper associated with one of the compartments is closed to isolate the compartment, the closure members seal off the inlet duct to form a chamber within the duct which is vented to the atmosphere through an air damper adapted to admit heated ambient air into the chamber to prevent the flue gases from seeping into the compartment.

10 Claims, 4 Drawing Figures

METHOD AND APPARATUS FOR SEALING THE INLET OF A FILTER COMPARTMENT TO ISOLATE THE COMPARTMENT WITHIN A BAGHOUSE INSTALLATION

BACKGROUND OF THE INVENTION

1. Field of the Invention

The present invention relates to a flue gas cleaning system and in particular to a method and apparatus for minimizing condensation of corrosive agents in the filter compartments of a baghouse installation.

2. Description of the Prior Art

In the typical baghouse installation, flue gases are drawn from a common inlet manifold into a bank of filter compartments wherein the gases are filtered through a plurality of filter bags to remove the suspended particulates from the gases. The filtered gases then exit the compartments and flow into a common outlet manifold from which they are directed into a chemical scrubber to remove the sulfur oxides and other corrosive agents in the gases prior to discharging them into the atmosphere.

In systems of this type, it has been the practice to admit the gases into the filter compartments at a temperature above the dew point temperature of the corrosive agents in the gases while maintaining a relatively uniform gas flow through each of the compartments. This prevents the formation of stagnate gas zones in the filter compartments where the gases could cool down below the dew point of the corrosive agents which would cause the agents to condense in the compartments. For this reason, it has generally been necessary to close off or isolate one or more of the filter compartments when the gas flow rate drops due to a reduced load on the boilers served by the system in order to maintain an adequate flow rate in the remaining compartments. However, when one of the compartments is isolated, the flue gases trapped in the compartment begin to cool and ultimately the corrosive agents condense if the compartment is not put back on line before the temperature of the gases drops below the dew point.

In addition to the foregoing, experience has indicated that even greater accumulations of corrosive agents can be expected to form in the isolated compartments as a result of condensation in the flue gases seeping through the dampers closing off the isolated compartments. For example, in a baghouse installation where each compartment is designed to clean about 80,000 ACFM (actual cubic feet per minute) of the gases, the seepage rate through each of the isolated compartments is in the range of 80-400 ACFM or 0.1-0.5 percent of the gas flowing through the compartment during normal filtering operations. Assuming the flue gases include about 10 parts per million $SO_3$, which is fairly typical for a coal fire boiler, as the isolated compartment cools the filter bags will be exposed to about 15 gallons of sulfuric acid condensing out of the flue gases trapped in the compartment when it was isolated, and 2-20 gallons of acid for each hour the compartment is kept off line.

Considering the above, it can be seen that acid condensation in the isolated compartments can have a very deliterous effect on the life of the filter bags and the metal housing of the baghouse installation, as well as increasing pressure losses in the gases as they flow through the compartments due to deterioration of the filter bags and the accumulation of sulfates and other particulates on the bags which generally cannot be dislodged by conventional bag cleaning procedures.

SUMMARY OF THE INVENTION

The present invention relates to a flue gas cleaning system and in particular to a method and apparatus for minimizing condensation of corrosive agents in the filter compartments of a baghouse installation when one or more of the compartments are taken off line and isolated during filtering operations. This invention is related to the applicant's copending U.S. Patent Applications having Ser. Nos. 310,128 and 310,132 having the same filing date as this application.

In the baghouse installation embodying the invention, flue gases are drawn at subatmospheric pressure from a common inlet manifold into a bank of parallel filter compartments wherein the gases are filtered through a plurality of filter bags. The filtered gases leave the filter compartments and flow into a common outlet manifold from where they are directed into a chemical scrubber or the like prior to discharging them to the atmosphere. In order to maintain a sufficient flow rate in the flue gases as they flow through the compartments when the flow rate of the flue gases drop due to a reduced load on the boiler served by the baghouse installation, one or more of the filter compartments are taken off line and isolated within the installation. This results in all of the flue gases being directed through the remaining compartments to maintain the flow rate within those compartments at the desired level.

The invention utilizes a damper having a pair of spaced closure members in the inlet of each of the compartments adapted to form an air chamber in the inlet duct of the compartment to be isolated between the inlet manifold and the compartment when the damper is closed to isolate the compartment. The chamber is vented to the atmosphere to allow a preheated stream of ambient air to flow into the chamber to form a pressurized zone in the inlet duct which prevents the flue gases from seeping into the isolated compartment through the inlet damper. Preferably, the ambient air stream is heated to a temperature in the vicinity of the dew point temperature of the corrosive agents in the gases to prevent any air seeping into the compartment through the inlet damper from cooling the flue gases in the compartment to the dew point where the corrosive agents would begin to condense.

From the foregoing, it can be seen that the invention contemplates an arrangement which essentially eliminates acid condensation in the filter compartments when they are isolated to accommodate operating the baghouse installation at varying flue gas loads, thereby substantially reducing pressure losses in the flue gases flowing through the installation while increasing the service life of the filter bags; however, it is to be understood that various changes can be made in the arrangement, form, and construction of the apparatus disclosed herein without departing from the spirit and scope of the invention.

DESCRIPTION OF THE PREFERRED EMBODIMENT

Figure 1:
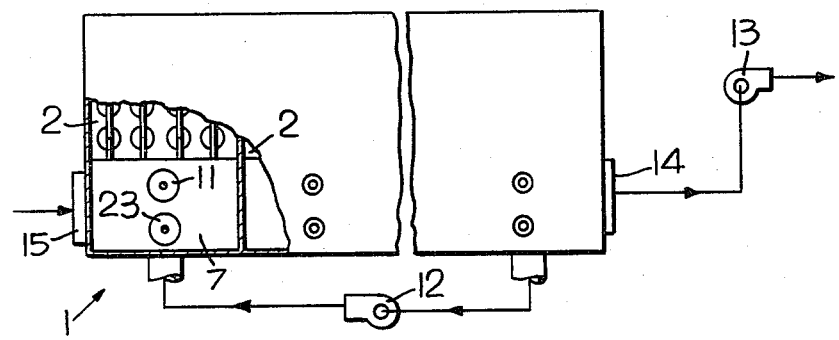
FIG. 1 is a top plan view, partially in section, of a baghouse installation embodying the invention.
Figure 2:
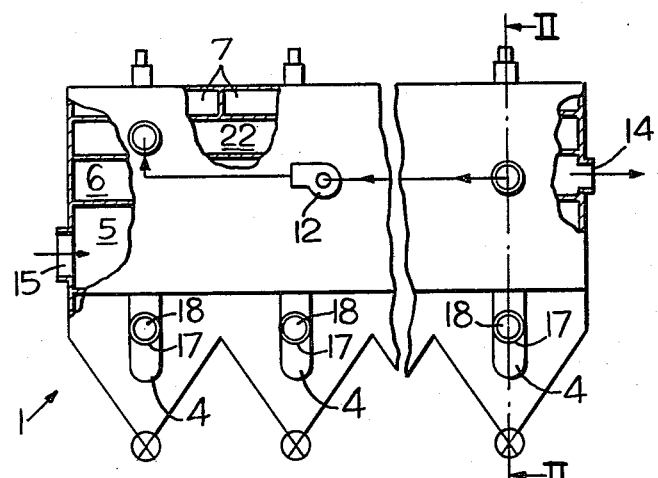
FIG. 2 is a front elevational view, partially in section, of the baghouse installation shown in FIG. 1.
Figure 3:
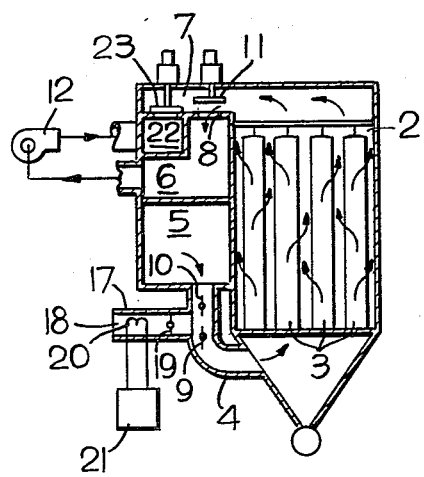
FIG. 3 is a cross-sectional view taken substantially along line III—III in FIG. 2.

Referring to FIGS. 1-3, the baghouse installation 1 incorporating the isolation system embodying the invention includes a plurality of adjacent filter compartments 2 having a plurality of tubular filter bags 3 suspended within them to filter hot flue gases flowing through the compartments in the conventional manner. Each of the filter compartments 2 is connected through a separate inlet duct 4 to a common inlet manifold 5 and to a common outlet manifold 6 through a separate outlet passage 7 opening into the outlet manifold through an outlet port 8. The inlet ducts 4 are each provided with a pair of spaced butterfly type dampers providing a pair of spaced closure members 9 and 10, or alternatively a conventional double bladed damper having a pair of spaced closure members such as shown in U.S. Pat. No. 4,191,212, which can be manipulated to close off the inlet duct. Similarly, each of the outlet ports 8 has a poppet-type damper 11 such as that shown in U.S. Pat. No. 3,898,997 overlying it for selectively closing off the outlet ports 8. As will be described, these dampers allow the filter compartments to be taken off line or isolated while keeping the other compartments in service. Additionally, as discussed in the applicant's copending patent applications noted above, the installation includes a blower 12 and associated ducting which is adapted to draw a stream of filtered gases from the outlet manifold 6 and direct it into a common reverse gas manifold 22. This arrangement accommodates periodic cleaning of filter bags in each of the compartments by closing the outlet damper 11 of that compartment and opening an associated damper 23 on the reverse gas manifold to allow a countercurrent stream of filtered gases to flow through the filter bags in each of the compartments from the reverse gas manifold.

As shown in the drawings, a blower or fan 13 is connected to an outlet 14 at one end of the outlet manifold 6 to maintain a draft in the filter compartments which draws the flue gases into the inlet manifold 5 through an inlet 15 in the end of the inlet manifold. The flue gases in the inlet manifold 5 are drawn by the draft into the filter compartments 2 through the inlet ducts 4 whereafter they flow through the filter bags and into the outlet manifold 6 via the outlet passages 7 and the outlet ports 8. In this regard, it should be noted that the blower 13 is sized to maintain the gases within the manifolds and the filter compartments at subatmospheric pressures. For example, in a baghouse installation wherein each of the filter compartments contains 400 tubular filter bags made of fiberglas cloth providing about 100 square feet of filter media per bag and which is adapted to filter approximately 80,000 ACFM (actual cubic feet per minute) of flue gases, the blower should maintain a pressure of about −13 inches water gauge in the outlet manifold. That results in a pressure of about −7 inches water gauge in the inlet manifold due to pressure losses in the gases as they flow through the filter compartments. Typically, when fiberglas bags are used the pressure differential between the inlet and outlet manifolds should be in the range of 4-7 inches water gauge.

As noted above in regard to the prior art, when the total volumetric flow rate of the flue gases entering the inlet manifold falls below a predetermined level due to a reduced load on the boilers served by the baghouse installation, it has been the practice to take one or more of the filter compartments off line by isolating them within the system. This maintains a relatively constant gas flow within the remaining compartments still on line to prevent the development of stagnate gas zones within the compartments which experience has shown promotes localized cooling of the gases and thus condensation of the corrosive agents within the compartments.

In practice, the flow rate of the flue gases within the compartments is characterized by the air-to-cloth ratio of the installation which is defined as the total volumetric flow rate of the flue gases passing through the compartments divided by the total area of filter media in use. In the foregoing example, assuming that baghouse installation is designed to filter flue gases having a high sulfide content entering the compartment at a temperature in the range of 260°–350° F., the air-to-cloth ratio should be maintained in the range of 1.7–2.2:1 in order to maintain the gases above the dew point temperature of the corrosive agents. For example, in a baghouse installation having ten filter compartments designed to filter flue gases flowing at 800,000 actual cubic feet of gas per minute, in order to maintain an air-to-cloth ratio of 2:1 the filter bags in each compartment should provide about 40,000 square feet of media. However, if the flow rate of the flue gases from the boiler served by the baghouse installation drops by 25 percent, the air-to-cloth ratio characterizing the gas flow within the compartments would drop proportionally to about 1.5:1. At that level, dead or stagnate gas zones will tend to develop in the compartments which in turn leads to acid condensation. Therefore, to maintain the gas flow above this level and thus prevent condensation within the compartments, one or more of the compartments are isolated to maintain the gas flow in the remaining compartments at an acceptable level. In this case, isolating one of the compartments will maintain the gas flow at a rate providing an air-to-cloth ratio of about 1.9:1 which is well within the range of 1.7–2.2:1 which experience has shown to be appropriate for this type of installation.

Although isolating one of the compartments retards condensation in the remaining compartments still on line, flue gases seeping through the closure members 9 and 10 and outlet damper 11 of the isolated compartment tend to increase condensation in that compartment. This occurs when the compartment is taken off line and the flue gases trapped within it begin to cool, and as a result of condensation in the flue gases seeping through the closure members and the outlet dampers due to the pressure differential between the inlet and outlet manifolds. By way of illustration, assuming the flue gases in the foregoing system include 10 parts per million $SO_3$ with a dew point temperature of approximately 230° F., up to 15 gallons of sulfuric acid having a PH of 2.1 could be expected to condense in the isolated compartment as it cools, and additionally, condensation in the flue gases seeping into the compartment could be expected to add an additional 2–10 gallons of acid for each hour the compartment is isolated. Clearly, these are very substantial quantities of acid which would have a very deleterious effect on the life of the filter bags and the metal housing of the compartment, as well as increasing pressure losses within the compartment due to the resulting deterioration of the filter bags and the accumulation of sulfates and other particulates on the bags which generally cannot be dislodged by the conventional bag cleaning procedures.

Figure 4:
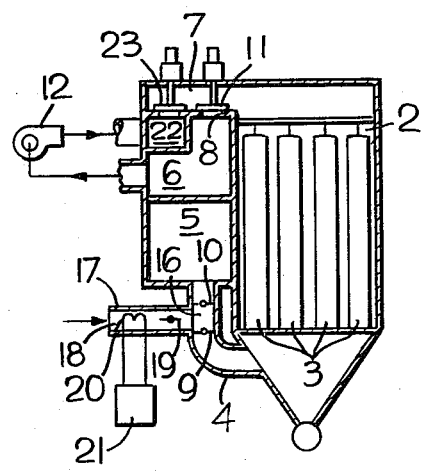
FIG. 4 is a view similar to FIG. 3 showing one of the filter compartments when it is isolated with the compartment inlet sealed to prevent flue gases from seeping into the compartment.

As noted above, a pair of spaced closure members 9 and 10 are provided in each of the inlet ducts 4 which can be rotated between an open position allowing the flue gases to flow into its respective filter compartment as shown in FIG. 3, and a closed position whereat the closure members 9 and 10 cooperate with the interior surface of the inlet duct 4 to form a chamber 16 within the inlet duct to isolate the compartment as shown in FIG. 4. Each of the chambers 16 are selectively vented to the atmosphere through an air damper housing 17 which is secured to each of the inlet ducts 4 and includes a conduit 18 opening into the inlet duct between the closure members 9 and 10. During normal filtering operations, each of the conduits 18 is closed off by a butterfly type damper 19 which is mounted within the housing to prevent ambient air from flowing into the inlet duct. However, when the closure members 9 and 10 of one of the compartments are closed to isolate that compartment, the damper 19 is opened to vent the chamber 16 to the atmosphere. Since the gas pressures within the compartment and the manifolds are below atmospheric pressure, the ambient air flows into the chamber 16 and forms a pressure barrier within the chamber which prevents the flue gases from seeping around the closure members and into the isolated compartment. In practice, a small quantity of the ambient air in the chamber seeps around the closure members 9 and 10 into the isolated compartment and the inlet manifold. Therefore, a heating element 20 connected to a conventional power source 21 is secured in the conduit 18 to heat the ambient air to a temperature in the vicinity of the dew point temperature of the corrosive agents in the flue gases as it flows into the chamber 16. This prevents any air seeping around the closure members from cooling the flue gases trapped in the isolated compartment. Typically, in baghouse installations for cleaning flue gases having substantial sulfide concentrations such as in the foregoing example, the ambient air would be heated to a temperature in the range of 245°–335° F., it being noted that the heating element and the power source can be selected from any one of a variety of commercially available gas heating devices.

The embodiments of the invention in which an exclusive property or privilege is claimed are defined as follows:

1. A method for isolating a filter compartment in a gas cleaning system having a plurality of filter compartments wherein hot dirty gases containing corrosive agents are directed into a common inlet manifold and drawn into the filter compartments through an inlet passage connecting the inlet manifold with each of the compartments including first damper means adapted to regulate the flow of dirty gasses through the inlet passage and second damper means connected to said inlet passage, said second damper means being in flow communication with said first damper means and a source of pressurized air wherein the dirty gases flow through filter bags supported within the compartments and exit each of the compartments through third damper means regulating flow of gas from connecting each compartment to a common outlet manifold, comprising:

closing the third damper means of the compartment to be isolated to prevent the flow of gases between said compartment and the outlet manifold;

closing the first damper means in the inlet passage of said compartment to prevent the flow of gases between said compartment and the inlet passage, said first damper means having a pair of spaced closure members movable between an open position allowing the flow of gases through the inlet passage and a closed position whereat the closure members are positioned and arranged with respect to the interior surface of the inlet passage to form a chamber within the passage; and opening the second damper means to said source of pressurized air so as to supply pressurized air to said chamber at a pressure above the pressure of the dirty gases in the inlet passage to form a pressurized zone within the inlet passage preventing seepage of dirty gases into said compartment.

2. The method of claim 1 including the step of heating the pressurized air to a temperature near the dew point temperature of the corrosive agents in the dirty gases prior to admitting it into said chamber.

3. The method of claim 1 wherein the dirty gases in the system are maintained at subatmospheric pressures and said second damper means is vented to the atmosphere to provide said source of pressurized air.

4. The method of claim 1 including the step of selectively isolating a predetermined number of the compartments to maintain a preselected gas flow within each of the remaining compartments in porportion to the volumetric flow rate of the dirty gases flowing into the inlet manifold.

5. The method of claim 1 including the step of selectively isolating a predetermined number of the compartments to maintain the temperature of the gases in the remaining compartments above the dew point temperature of the corrosive agents in said gases.

6. The method of claim 1 wherein the dirty gases are flue gases containing sulfur oxides.

7. The method of claim 6 including the step of selectively isolating a predetermined number of the compartments to maintain a gas flow within the remaining compartments sufficient to maintain the temperature of the gases in the outlet manifold in the range of approximately 245°–335° F. when the temperature of the gases in the inlet manifold is in the range of approximately 260°–350° F.

8. The method of claim 7 including the step of maintaining a pressure differential between said inlet and outlet manifolds in the range of 4–7 inches water gauge to maintain an air-to-cloth ratio for the system in the range of 1.7–2.2 feet per minute.

9. In a gas treating system for cleaning a stream of hot dirty gases containing corrosive agents at subatmospheric pressures including a plurality of filter compartments and common inlet and outlet manifolds, wherein each of the filter compartments includes an inlet duct opening into the inlet manifold and an outlet passage opening into the outlet manifold to accommodate drawing the gas stream through the compartment into the outlet manifold from the inlet manifold, and a plurality of filter bags secured within the compartments to filter the gases as they are drawn through the compartments, the improvement comprising:

outlet damper means connected with each compartment and being selectively positionable to close off its respective outlet passage to prevent the flow of gases between the compartment and the outlet manifold;

inlet damper means connected with each compartment including a pair of spaced closure members selectively positionable across its respective inlet duct to close off said duct to form a chamber within it between the closure members; and additional damper means connected with each of the inlet ducts and in flow communication with said chamber for selectively venting the chamber formed in each of the ducts to the atmosphere upon opening said additional damper means; whereby one of the compartments can be isolated during operation of the gas treating system by closing the inlet and outlet damper means of said compartment and then opening the additional damper means associated with said compartment, thereby allowing a stream of ambient air to flow into the chamber within the inlet duct of said compartment to form a pressurized zone within said duct preventing the seepage of dirty gases into said compartment.

10. The system according to claim 9, further comprising gas heating means connected with said additional damper means for heating the ambient air stream to a temperature above the dew point temperature of the corrosive agents in the dirty gases prior to admitting it to the chamber through said additional damper means.

* * * * *

UNITED STATES PATENT OFFICE
CERTIFICATE OF CORRECTION

Patent No. 4,364,749    Dated December 21, 1982

Inventor(s) S. Michael Dunseith

It is certified that error appears in the above-identified patent and that said Letters Patent are hereby corrected as shown below:

Column 5, line 64, delete "connecting".

Signed and Sealed this

Twenty-eighth Day of June 1983

[SEAL]

Attest:

GERALD J. MOSSINGHOFF

Attesting Officer    Commissioner of Patents and Trademarks